Jan. 5, 1937. P. DRINKER ET AL. Re. 20,226
RESPIRATION APPARATUS
Original Filed July 23, 1929 2 Sheets-Sheet 1
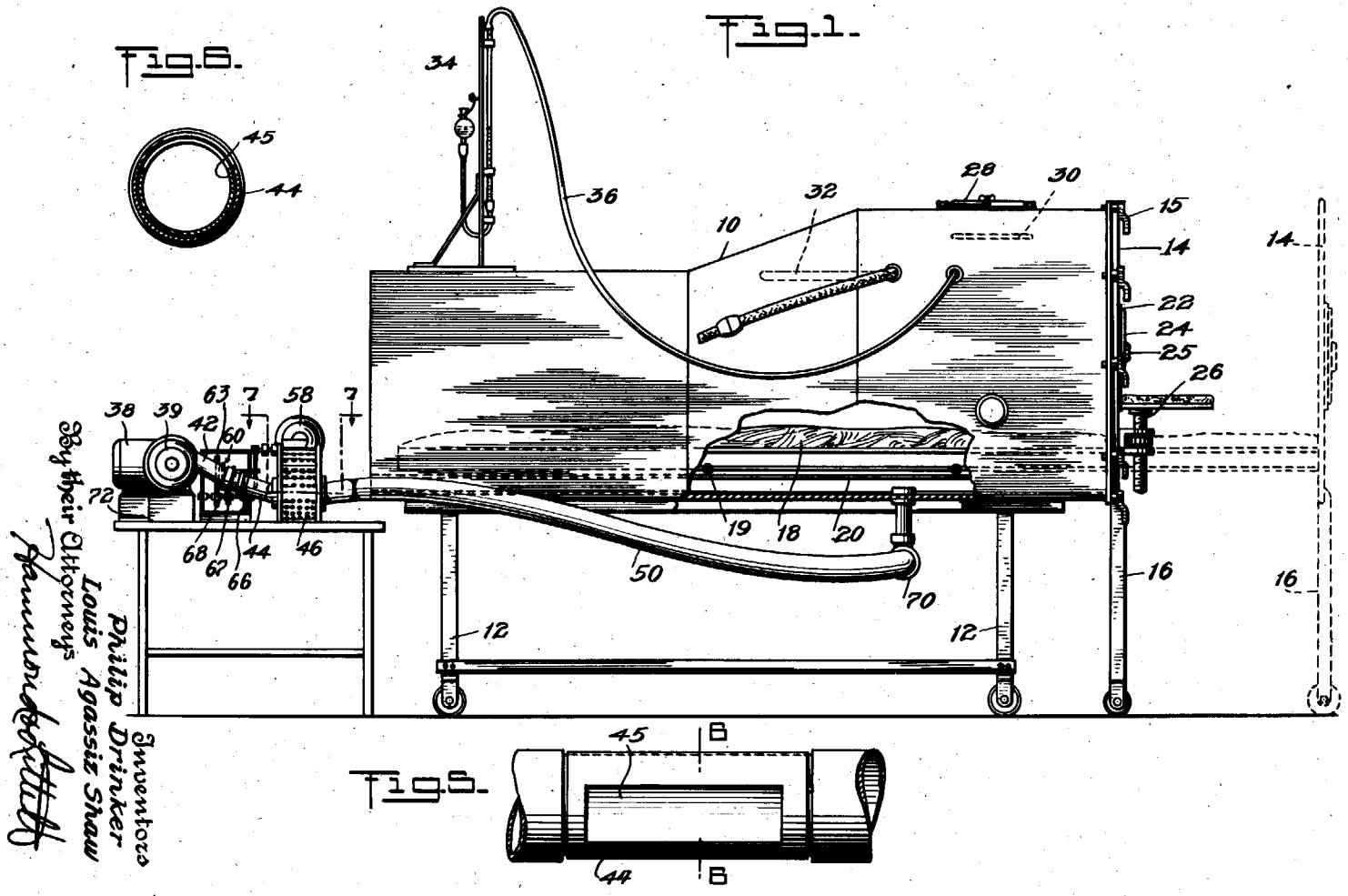
Inventors
Philip Drinker
Louis Agassiz Shaw
By their Attorneys
Hammond & Littell Jan. 5, 1937. P. DRINKER ET AL Re. 20,226
RESPIRATION APPARATUS
Original Filed July 23, 1929 2 Sheets-Sheet 2
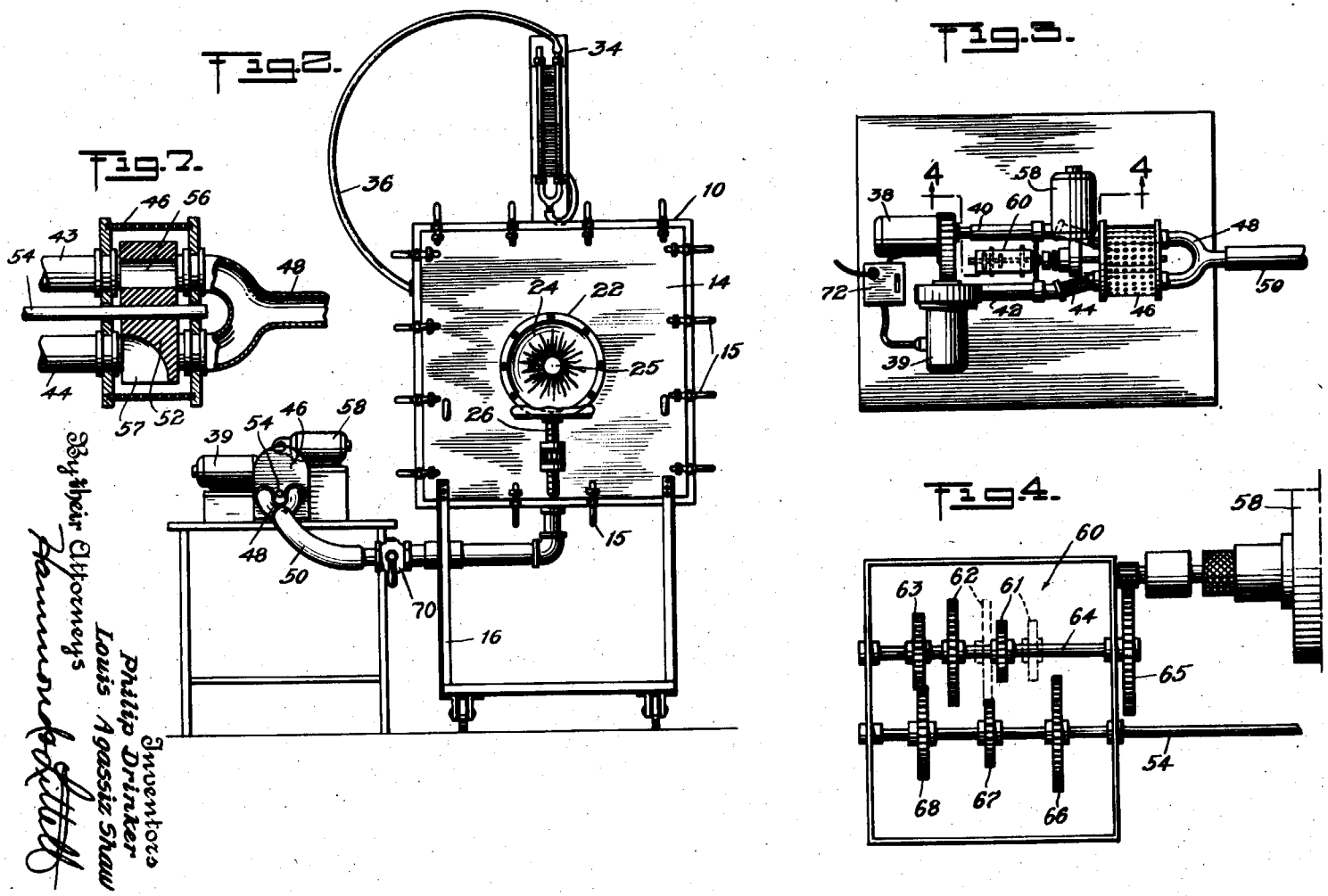
Inventors
Philip Drinker
Louis Agassiz Shaw
By their Attorneys
Hammond & Littell Reissued Jan. 5, 1937 Re. 20,226

UNITED STATES PATENT OFFICE 20,226

RESPIRATION APPARATUS

Philip Drinker and Louis Agassiz Shaw, Boston, Mass., assignors, by mesne assignments, to Warren E. Collins, Warren E. Collins, Jr., and Walter G. Chick, all of Boston, Mass.; Warren E. Collins, Jr., executor of said Warren E. Collins, deceased Original No. 1,834,580, dated December 1, 1931, Serial No. 380,271, July 23, 1929. Application for reissue June 1, 1936, Serial No. 82,941

11 Claims. (Cl. 128—30)

This invention relates to an apparatus for providing artificial respiration for human beings.

It is a primary object of the invention to provide an apparatus suitable for practical use in hospitals and the like in which a patient may be treated without subjecting his body to strain, and which will simulate natural breathing in the patient, both as to the periods of exhalation and inhalation and as to the quantity of air drawn into the lungs of the patient, thus resulting in artificial breathing which will be regular and rhythmic.

It is a further object of the invention to provide an apparatus of this character in which the patient will be at his ease during the treatment and in which he can breathe naturally, if so inclined, or in which he may be assisted to any desired extent by the apparatus.

It is a further object to provide an apparatus of this character in which the patient can talk, eat and sleep without discomfort and without discontinuing the treatments.

Another object of the invention is to provide an apparatus from which the patient's body may be quickly withdrawn and returned without having to shift one portion of the patient's body relative to another portion and without material loss of time.

These and other objects will appear more fully from the following description when considered in connection with the drawings, in which:

Fig. 1 is a side elevational view of one form which our apparatus may assume.

Fig. 2 is a front elevational view thereof.

Fig. 3 is a slightly enlarged plan view of one form of pressure producing apparatus and alternator.

Fig. 4 is a detailed view approximately on the line 4—4 of Fig. 3 showing the reduction gears employed for varying the period of the pressure changes.

Fig. 5 is a detailed view of one of the exhaust valves.

Fig. 6 is a sectional view on the line 6—6 of Fig. 5.

Fig. 7 is a detailed view on the line 7—7 of Fig. 1 showing the valve mechanism of the alternator.

Referring to the details of the drawings, there is provided a relatively strong, air-tight casing 10 of any preferred shape which is constructed of sufficient length, height and breadth to accommodate the body of a large man or woman. The casing 10 is supported upon any suitable standard, as indicated for example at 12, whereby the casing is placed at a convenient height for use. One wall of the casing, preferably the front wall 14, is removable to provide access to the interior thereof. The front wall 14 has an additional support 16 facilitating the movement of the wall 14 toward or away from the casing 10. The casing 10 and the wall 14 are made sufficiently rigid that they will not flex or bend under the pressures used inside the respirator.

A body support 18, shown as a mattress, and its supporting frame, is mounted for movement into or out of the casing 10. Rollers 19 and a cooperating track 20 on the floor of the casing serve to support the body rest 18 within the casing and to permit the withdrawal of the body support from the casing when desired. The body support 18 and a head rest 26 are attached to the end wall 14 and when withdrawn are supported by the support 16, so that the entire bed 18, head rest 26 and movable wall 14, may be moved toward and away from the casing with the patient resting thereon, to expose the body of the patient, without having to shift or move the body or head of the patient relative to the bed or head rest.

The end wall 14 is provided with an opening 22 large enough to receive the patient's head which receives a flexible sealing member 24 formed of relatively strong, flexible rubber. The sealing member 24 has a central opening 25 adapted to fit snugly around the neck of the patient. The head of the patient may be passed through the opening 22 due to the resiliency of the material of the sealing member 24. The member 24 is removably attached within the opening 22 and is sealed at its outside edge against the admission of outside air by means of the securing bolts shown or other equivalent means. Several different sizes of collars or sealing members 24 may be provided and the one best suited to the size of the patient selected.

The head of the patient is allowed to rest upon a support 26 positioned just outside of the opening 22 and adjustable vertically to accommodate the particular patient being treated. Any suitable adjustment means may be used for the support 26.

The casing 10 is provided with various accessories to modify the condition within the same and to indicate such conditions. To this end, the casing is provided with one or more openings 28 closed by means of transparent closures so that the interior of the casing may be inspected. The closure for the opening 28 is preferably of thin aluminum or glass composition, so that X-ray or ordinary pictures may be taken of the patient without removing the body from the casing. A thermometer 30 indicates at all times the temperature within the casing. This temperature is normally maintained at substantially room temperature by the air-flow to and from the casing as described below. The temperature may be raised at any time by means of an electric light 32 mounted in the casing, or lowered by passing the air through a suitable cooling medium.

The degree of pressure or partial vacuum within the casing is indicated at all times by means of an open manometer 34, one leg of which is connected to the casing 10 by means of a tubular conductor 36, the other leg being exposed to the outside air. The manometer is provided with a suitable chart to indicate the degree of suction or pressure then present. The manometer 34 thus serves as an indicator of the pressure conditions within the casing. The manometer also serves as a pressure or suction relief valve in that any excessive pressure or suction blows or draws the fluid out of the open manometer and thus relieves the excessive pressure or suction condition within the casing.

The mechanism for providing alternate suction and pressure conditions within the casing 10 may be constructed in various manners. In the present embodiment, we have shown a preferred construction wherein a plurality of centrifugal air compressors 38 and 39 are connected in series relation to the suction tube 40 and pressure tube 42. This construction is preferred in that it provides a substantial air flow and sufficient pressure for the proper operation of the apparatus at all times. The tubes 40 and 42 are formed with vents 43 and 44 which are normally closed, but which permit either the suction or pressure portion of the apparatus to be rendered ineffective. The rotary closures 45 may be readily adjusted to open or close the tubes 40 or 42 with respect to the outside air. The tubes 40 and 42 pass through the valve mechanism or alternator 46 and may thence pass to a Y-joint 48, the latter being connected by a relatively large tube 50 with the interior of the casing.

The alternator 46 includes a rotary valve member 52 mounted for rotation with a shaft 54 and formed with a transverse opening 56 and a cut-away portion 57. The openings 56 and 57 are constructed to be placed alternately in the path of the tubes 40 and 42 so as to cause one of these tubes to communicate with the tubular member 50 and the other member to be exposed to the outside air through the cut-away portion 57. On rotation of the valve member 52 about a half circle the other tube (42 or 40) will then be placed in communication with the tubular member 52 and the opposed member (40 or 42) placed in communication with the outside air.

Rotation of the valve shaft 54 is accomplished by means of a timing motor 58 and a set of reduction gearing indicated generally at 60. This gearing includes three stages or sets of gears which have been found sufficient for our purposes. The gears 61, 62 and 63 are mounted rigidly on a shiftable shaft 64 having a squared portion to cause the same to be rotated with the gear 65 driven from the motor 58. The driven shaft 54 carries three cooperating gears 66, 67 and 68 which may be enmeshed with any of the shiftable gears 61, 62 or 63 respectively. When the gears 61 and 66 are in mesh, the shaft 54 is driven at a relatively slow speed. This provides the minimum number of alternations of pressure conditions, for example 12 to 16 changes per minute. This is the adjustment normally used for adults. When the gears 63 and 68 are enmeshed the shaft 54 is driven at an intermediate speed and provides approximately 20 to 24 alternations of the pressure condition per minute. This is the adjustment employed for small children up to six or eight years of age. When the gears 62 and 67 are enmeshed the shaft 54 is rotated more rapidly providing alternations in the pressure changes at a relatively higher rate of from 45 to 60 pressure changes per minute. This adjustment is used for the treatment of very small children, for example, premature and still-born babies.

While the pressure and suction pumps 38 and 39 provide greater degrees of pressure and partial vacuum than required for the normal use of the apparatus, their effect may be varied to any extent by means of the adjustment valve 70. This valve is manually adjustable to permit only a sufficient amount of air to pass the same to increase or decrease the pressure within the casing to the extent desired. It will be evident that if the valve 70 is adjusted to provide a relatively small opening permitting the passage of air therethrough, the pressure or partial vacuum condition within the casing 10 will reach a much lower extent than where the valve 70 is wide open and the entire force of the compressors is directly admitted into the interior of the casing. The usual degree of vacuum or pressure required for producing artificial breathing in the average patient is about 5 to 15 centimeters of water, although 30 centimeters of water or more may be required to cause the subject to fall into rhythm with the pump.

Suitable switches indicated generally at 72 supply electric current to the timing motor 58 and to the motors of the compressors 38 and 39.

In the operation of the above apparatus, the clamps 15 are unfastened and the end wall 14 and body support 18 are moved outwardly from the casing 10 into position to receive the body of the patient. The head of the patient is passed through the opening 22, the flexible sealing member of which is enlarged to permit the passage of the head of the patient therethrough. The flexible member then contracts into engagement with the neck of the patient and provides a seal at this point against the outside air. The adjustable head rest 26 adjusted to suit the patient and the end wall 14 is then moved inwardly toward the casing and the clamps 15 tightened to seal the wall 14 against the casing 10. The body of the patient is thus entirely within and subjected to the pressure conditions within the casing, yet the head of the patient is exposed for observation or treatment and the patient is entirely at ease. The shaft 64 is shifted to cause the proper gears to enmesh as described above for the patient then being treated. The switch 72 is then actuated to start the timing motor and compressors. The valve 70 is adjusted while observing the manometer 34 to provide the proper extent of the pressure variations within the casing. Thereafter the patient is observed and if a higher temperature is necessary within the casing, the light 32 is lighted and the temperature correspondingly increased. The body of the patient may be observed within the casing through the opening 28. The patient may be given food or medicine, and can sleep or talk without interrupting the treatment.

If access to the patient's body is desired at any time during treatment, the entire body on the bed 18 may be quickly withdrawn from the respirator by releasing the clamps 15 and sliding the bed 18, rigid wall 14 and head rest 26 as a unit away from the casing 10, without disturbing the position of the patient's body or head resting on the bed 18 and head rest 26. On sliding the body back into the casing, an air-tight seal is quickly made between the wall 14 and a rubber gasket fitted in the end wall of the casing 10.

If at any time it appears that the patient is breathing normally and of his own power, the valve 70 may be entirely closed and the apparatus used as a plethysmograph. Any natural breathing of the patient may thus be observed in the manometer without disturbing the patient or the apparatus in any other manner. If it appears that the patient is not breathing naturally, the valve 70 may be opened again and the artificial respiration resumed.

It will be evident that many variations may be made in the apparatus within the principles of the invention as stated above, the shape and size of the casing may be varied and any desired mechanism used to effect the pressure changes therein without departing from the spirit of our invention or the scope of the accompanying claims.

Having thus described our invention, what we claim as new and desire to secure by Letters Patent is:

1. In an appartus for producing artificial respiration, a casing constructed to receive the major portion of the body of a patient, a bed which is slidable into and out of said casing, said casing having a rigid removable wall section connected to said bed and slidable therewith and including an opening through which the head of the patient may be passed, a head rest supported on said removable wall section and movable therewith, a sealing member positioned in said opening and formed with a restricted opening adapted to fit snugly around the neck of the patient, means for forming a seal between said movable wall and the casing and means for producing alternate variations of pressure within said casing.

2. In an apparatus for producing artificial respiration a portable hollow casing having an open end, a portable carriage carrying a bed adapted to receive the body of a patient and to slide in and out of said casing, a rigid closure for the open end of said casing connected to said carriage and movable therewith having an opening through which the patient's head projects, a head rest connected to said closure for supporting the patient's head and means to provide a seal between the neck of the patient and said opening, means to seal said closure to the open end of said casing, and means to induce periodic variations of pressure within said casing.

3. In an apparatus for producing artificial respiration, a hollow casing having an open end, a portable carriage adapted to receive the body of a patient and to slide within said casing, a rigid closure for the open end of said casing connected to said carriage and movable therewith, means to seal said casing with the head of the patient external of said casing, means connected to the closure and movable therewith to support the head of the patient, clamp means to permit unsealing of the casing and removal of the patient's body on the portable carriage, and means to periodically vary the pressure within said casing from a negative pressure to atmospheric pressure when the casing is sealed and to regulate the rate of said variations to correspond to the normal rate of breathing.

4. In an apparatus for producing artificial respiration a hollow casing having a rigid removable wall section with an opening for the head of the patient, a portable carriage to receive the body of a patient, means to slide said carriage into and out of said casing, means to seal said casing with the head of said patient projecting through said opening in the removable wall section, a pump, a distributor valve between said pump and said casing to periodically vary the pressure within said casing and means to control the maximum and minimum amounts of said pressure variation.

5. An apparatus for producing artificial respiration comprising a hollow casing having a removable wall section with an opening for the head of the patient, a portable carriage to receive the body of a patient, means to slide said carriage into and out of said casing, means to seal said casing with the head of said patient projecting through the opening in the removable wall section, a pressure control device, a distributor valve between said control device and said casing to periodically vary the pressure within said casing, means to control the maximum and minimum amounts of said pressure variation, a manometer connected to said casing to indicate the variations of pressure within said casing, and an inspection plate whereby the patient may be observed during the pressure variations.

6. A respirator apparatus for artificially producing respiration comprising a hollow casing having an open end, a patient receiving carriage slidable into and out of said casing, a rigid closure connected to said carriage and adapted to seal against the open end of said casing, said closure having a central aperture through which the patient's head may be projected and a collar to closely encompass the neck of the patient and a head rest connected to said closure and movable therewith to support the head of the patient outside the casing, said carriage adapted to receive the body of a patient and to be slid into said casing with the head of said patient extending outside of said casing and supported on said head rest, whereby the carriage closure and head rest may be moved as a unit to permit the patient's body to be inserted into the casing and removed therefrom without disturbing the position of the body on the carriage and head rest, said collar acting as a pressure seal whereby the body of said patient within said casing may be at a pressure different from the atmospheric pressure around the head of said patient, and means to periodically vary the pressure within said casing from a negative pressure to atmospheric pressure or above.

7. A respirator apparatus for artificially producing respiration comprising a hollow casing having an open end, a patient receiving carriage, and a rigid closure connected to said carriage and movable therewith and adapted to seal said casing, said closure having a central aperture through which the patient's head may be projected and a rubber collar to closely encompass the neck of the patient, said carriage adapted to support the body of the patient and to be slid into said casing with the head of said patient extending outside of said casing, said collar acting as a pressure seal whereby the body of said patient within said casing may be at a pressure different from the pressure upon the head of said patient, means to periodically vary the pressure within said casing from a below atmospheric pressure to atmospheric pressure or above, means to control the temperature within said casing including a warming means, cooling means and means to ventilate the casing, said casing having gauges whereby said internal conditions may be known.

8. In an apparatus for producing artificial respiration, a hollow casing for receiving the body of a patient, a body support slidable to and from the interior of said casing, said casing having a rigid removable wall section connected to and slidable with said body support, through which the head of the patient is adapted to project, a head rest connected to said removable wall section and movable therewith to support the head of the patient outside said casing, means for forming an air-tight seal around the neck of the patient and means for forming an air-tight seal between the removable wall section and the body of the casing, and means for producing alternate variations of pressure within said casing.

9. In an apparatus for producing artificial respiration, a hollow casing for receiving the body of a patient, a body support slidable to and from the interior of said casing, said casing having a rigid removable wall section including a flexible rubber sheet with an opening through which the patient's head may be inserted, said sheet being arranged to form an airtight seal around the neck of the patient, an adjustable head rest cooperating with said removable wall section to support the head of the patient, said body support, wall section and head rest being connected together to move as a unit, means to support one end of said movable unit when withdrawn from the casing while the other end is supported in the casing and means for producing alternate variations of pressure within said casing.

10. In an apparatus for producing artificial respiration, a hollow casing for receiving the body of a patient, a body support slidable into and out of said casing, said casing having a rigid removable wall section connected to said body support and slidable therewith and including a flexible rubber sheet with an opening for the patient's neck, said sheet being arranged to form an airtight seal around the neck of the patient while permitting movement of the head and neck, means for clamping the outer edges of said rubber sheet to form an airtight seal with the wall of the casing, means to form an independent seal between said removable wall section and the casing, a head rest connected to said removable wall section outside of said casing and means for producing alternate variations of pressure within said casing.

11. In an apparatus for producing artificial respiration a hollow casing for receiving the body of a patient, means to support said casing, a body support slidable into and out of said casing, said casing having a rigid removable wall section connected to said body support and slidable therewith and including a flexible elastic rubber sheet with an opening for the patient's neck, said sheet being sufficiently elastic to permit insertion of the head through the opening and being adapted in contracted condition to form an airtight seal around the patient's neck, means for clamping the outer edges of said rubber sheet to form an airtight seal with the wall of the casing, a head rest outside of the casing and connected to said removable wall section, supporting means connected to one end of said body support to support the same when withdrawn from said casing and means to support the other end of said body support in said casing and means for producing alternate variations of pressure within said casing when the casing is closed.

PHILIP DRINKER.
LOUIS A. SHAW.